(12) United States Patent
Hood et al.

(10) Patent No.: US 7,676,279 B2
(45) Date of Patent: Mar. 9, 2010

(54) SERVICES FOR INDUSTRIAL CONTROL SYSTEMS

(75) Inventors: Gavan W. Hood, Upper Lockyer (AU); Kenwood H. Hall, Hudson, OH (US); Sujeet Chand, Brookfield, WI (US); Paul R. D'Mura, Glendale, AZ (US); Michael D. Kalan, Highland Heights, OH (US); Kenneth S. Plache, Scottsdale, AZ (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 344 days.

(21) Appl. No.: 11/536,827

(22) Filed: Sep. 29, 2006

(65) Prior Publication Data

US 2008/0189636 A1    Aug. 7, 2008

(51) Int. Cl.
*G06F 19/00* (2006.01)
(52) U.S. Cl. .................. 700/17; 710/100; 715/764
(58) Field of Classification Search ............. 700/17–19, 700/83, 180; 710/100, 105, 107, 110; 715/764, 715/771, 780; 370/449
See application file for complete search history.

(56) References Cited

U.S. PATENT DOCUMENTS

| | | | |
|---|---|---|---|
| 5,485,620 A | 1/1996 | Sadre et al. | |
| 5,522,066 A | 5/1996 | Lu | |
| 5,530,861 A | 6/1996 | Diamant et al. | |
| 5,812,394 A | 9/1998 | Lewis et al. | |
| 6,067,299 A * | 5/2000 | DuRee | 370/397 |
| 6,085,222 A | 7/2000 | Fujino et al. | |
| 6,269,254 B1 * | 7/2001 | Mathis | 455/557 |
| 6,539,271 B2 | 3/2003 | Lech et al. | |
| 6,868,538 B1 | 3/2005 | Nixon et al. | |
| 7,016,759 B2 | 3/2006 | Kaever et al. | |
| 7,043,311 B2 | 5/2006 | Nixon et al. | |
| 7,080,066 B1 | 7/2006 | Scheurich et al. | |
| 7,089,530 B1 | 8/2006 | Dardinski et al. | |
| 7,096,465 B1 | 8/2006 | Dardinski et al. | |
| 7,194,446 B1 | 3/2007 | Bromley et al. | |
| 7,225,037 B2 | 5/2007 | Shani | |
| 7,395,122 B2 | 7/2008 | Kreidler et al. | |
| 7,418,305 B2 | 8/2008 | Buesgen et al. | |
| 7,505,817 B2 | 3/2009 | McDaniel et al. | |

(Continued)

FOREIGN PATENT DOCUMENTS

WO    WO 0195041 A1    12/2001

(Continued)

OTHER PUBLICATIONS

European Search Report for European Patent Application No. EP07117140, dated May 7, 2008, 8 pages.

(Continued)

*Primary Examiner*—Kidest Bahta
(74) *Attorney, Agent, or Firm*—Turocy & Watson LLP; William R. Walburn

(57) ABSTRACT

A message component for an industrial automation system is provided. This includes a service component that is employed to locate functionality of applications associated with a control system message bus. An operations component exchanges messages with the message bus, where the service component and the operations component form an external view to facilitate communications between the applications.

34 Claims, 11 Drawing Sheets

U.S. PATENT DOCUMENTS

| | | |
|---|---|---|
| 7,509,249 B2 | 3/2009 | Britt et al. |
| 2002/0059272 A1 | 5/2002 | Porter |
| 2003/0150927 A1* | 8/2003 | Rosen .................. 236/51 |
| 2003/0163656 A1* | 8/2003 | Ganton ................ 711/154 |
| 2004/0199925 A1 | 10/2004 | Nixon et al. |
| 2004/0230328 A1 | 11/2004 | Armstrong et al. |
| 2005/0256735 A1 | 11/2005 | Bayne |
| 2006/0037008 A1 | 2/2006 | Stelzer et al. |
| 2006/0179032 A1 | 8/2006 | Gottsman et al. |
| 2006/0206448 A1 | 9/2006 | Hyder et al. |
| 2006/0212146 A1 | 9/2006 | Johnson et al. |
| 2007/0089063 A1 | 4/2007 | Breyer |
| 2007/0142941 A1 | 6/2007 | McGreevy et al. |
| 2007/0256051 A1 | 11/2007 | Rojer |
| 2008/0022151 A1 | 1/2008 | Stange et al. |
| 2008/0040477 A1 | 2/2008 | Johnson et al. |
| 2008/0140230 A1 | 6/2008 | Bromley |
| 2008/0201297 A1 | 8/2008 | Choi et al. |

FOREIGN PATENT DOCUMENTS

WO    WO 2004086160 A1    10/2004

OTHER PUBLICATIONS

Sweet, et al. Managing Technology Change in Industrial Automation. Proceedings of the Third IEEE Conference on Control Applications, Aug. 24-26, 1994, pp. 3-6, vol. 1. An ABB Overview of Research Priorities.

Maaref, et al. Communication System for Industrial Automation, Proceedings of the IEEE International Symposium on Industrial Electronics, Jul. 7-11, 1997. Laboratoire Logiciels System Reseaux-Image, IEEE, pp. 1286-1291.

OA Dated Oct. 6, 2008 for U.S. Appl. No. 11/536,715, 23 pages.
OA Dated Oct. 29, 2008 for U.S. Appl. No. 11/536,746, 23 pages.
OA Dated Oct. 29, 2008 for U.S. Appl. No. 11/536,791, 43 pages.
OA Dated Oct. 7, 2008 for U.S. Appl. No. 11/536,760, 33 pages.
OA dated Apr. 13, 2009 for U.S. Appl. No. 11/536,746, 23 pages.
OA dated Mar. 24, 2009 for U.S. Appl. No. 11/536,715, 38 pages.
OA dated Apr. 23, 2009 for U.S. Appl. No. 11/536,760, 22 pages.
OA dated Apr. 17, 2009 for U.S. Appl. No. 11/536,791, 37 pages.
OA dated Aug. 24, 2009 for U.S. Appl. No. 11/536,746, 18 pages.
OA dated Aug. 21, 2009 for U.S. Appl. No. 11/536,760, 17 pages.
OA dated Aug. 6, 2009 for U.S. Appl. No. 11/536,791, 38 pages.
OA dated Oct. 20, 2009 for U.S. Appl. No. 11/536,715, 41 pages.

* cited by examiner

SERVICES FOR INDUSTRIAL CONTROL SYSTEMS

TECHNICAL FIELD

The subject invention relates generally to industrial control systems and more particularly to industrial control services that provide an external view of applications at an abstract level in order to facilitate communications between applications.

BACKGROUND

Industrial controllers historically have operated in factory networks where a plurality of controllers and associated I/O modules communicate. These lower level control elements are often in communication with higher level computing systems or servers that aggregate data from the controllers and help to manage day-to-day activities of an enterprise. As systems have become more complex however, communications and functional cooperation between components has become a challenge. For instance, when users purchase multiple products from one or more vendors there is often limited interoperability and consistency between such products. Software and control engineers must then learn their unique product and how the components interact with each other. Limited product and component consistency suggest that techniques engineers learn in one product do not necessarily carry over to other implementations. In general, control and application systems use different interfaces that make mapping difficult; meanwhile qualified personnel that understand both hardware and software environments are in short supply and command high salaries.

Often times, integration of products (production and automation systems in particular) is too complex and difficult to manage. Process and control engineers cannot code and configure their respective components of a solution without concern for other system components. In addition, system startup metrics are generally not sufficient to supply clear and measurable information for the user/integrator. In one example, a user specifies a line production system with both control and software system components. The development (customization) and integration cost is significant allowing for long ramp-up and integration due to the complexity of connecting systems and uncertainty of how the system will perform. This has a significant impact beyond the cost of the control system as line commissioning and ramp-up are delayed during control system integration. A more predictable process and less complex system integration capability will reduce these costs.

Another problem with current control solutions is that users currently focus on implementation and glue logic rather than the production solution at hand. The underlying technical details have become a primary worry where engineers from multiple environments do not focus on process information (application level concerns) and values exchanged, rather they more often focus on the "how" not the "what." For instance, a user may decide to automate a manual section of their plant. The design may start at a high level but soon becomes a series of discussions regarding nonfunctional requirements e.g., DCOM, TCP, transaction rates, and the like. While these nonfunctional requirements are important, the design of functional requirements is where the true value is to the designer or end user. Thus, the user would prefer to focus on functional requirements (equipment control, product flow control, and so forth) providing direct improvements in value rather than dealing with superfluous technology issues.

In another case, system design does not sufficiently enable trade-offs between overhead burden (memory footprint, CPU cycles, and so forth) and application coupling. For instance, processing load should be better distributed across the system in accordance with system capabilities. Thus, if one part of the system is shut down, alternative processing capability should be in place to allow production to continue. For example, a user initially designs and installs a control system suiting their immediate needs. Incremental changes are then applied to controllers and often new interface functions are added to the human machine interface (HMI) for such controllers. Current solutions however do not facilitate a smooth and uncomplicated transition for the respective changes. Multiple technologies underneath many vendors' products complicate configuration and management of systems. This is also aggravated when third party systems are involved. Such complexity hinders the system's capacity to provide higher-level information and reduces its ability to easily configure such systems.

SUMMARY

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

Industrial controller services are provided that present an abstraction for an industrial communications infrastructure to enable components to easily locate and connect desired functionality across the infrastructure. Services help locate and connect application interfaces between applications (or modules) to and from a control system message bus. Such services differ from web services since they are not restricted to standard http/SOAP implementations yet have the capability to interface with the control system message bus which is in contrast to web services. Although the services are compatible with web services they include operations that exchange messages with the message bus that include industrial protocols employed on the bus. Generally, services associate higher level behaviors to sources and destinations of control system messages such as: how the message will be processed; which output messages will be associated with input messages and vice versa; and how security and encoding rules are to be reconciled by sender and receiver applications. By employing the services to determine/locate available functionality, applications can be efficiently integrated across system components.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

DETAILED DESCRIPTION

Systems and methods are provided to facilitate communications for applications associated with industrial controller environments. In one aspect, a message component for an industrial automation system is provided. This includes a service component that is employed to locate functionality of applications associated with a control system message bus. An operations component is provided to exchange messages with the message bus, where the service component and the operations component form an external view for developers to facilitate communications between the applications.

It is noted that as used in this application, terms such as "component," "module," "service," and the like are intended to refer to a computer-related entity, either hardware, a combination of hardware and software, software, or software in execution as applied to an automation system for industrial control. For example, a component may be, but is not limited to being, a process running on a processor, a processor, an object, an executable, a thread of execution, a program and a computer. By way of illustration, both an application running on a server and the server can be components. One or more components may reside within a process and/or thread of execution and a component may be localized on one computer and/or distributed between two or more computers, industrial controllers, and/or modules communicating therewith.

Figure 1:
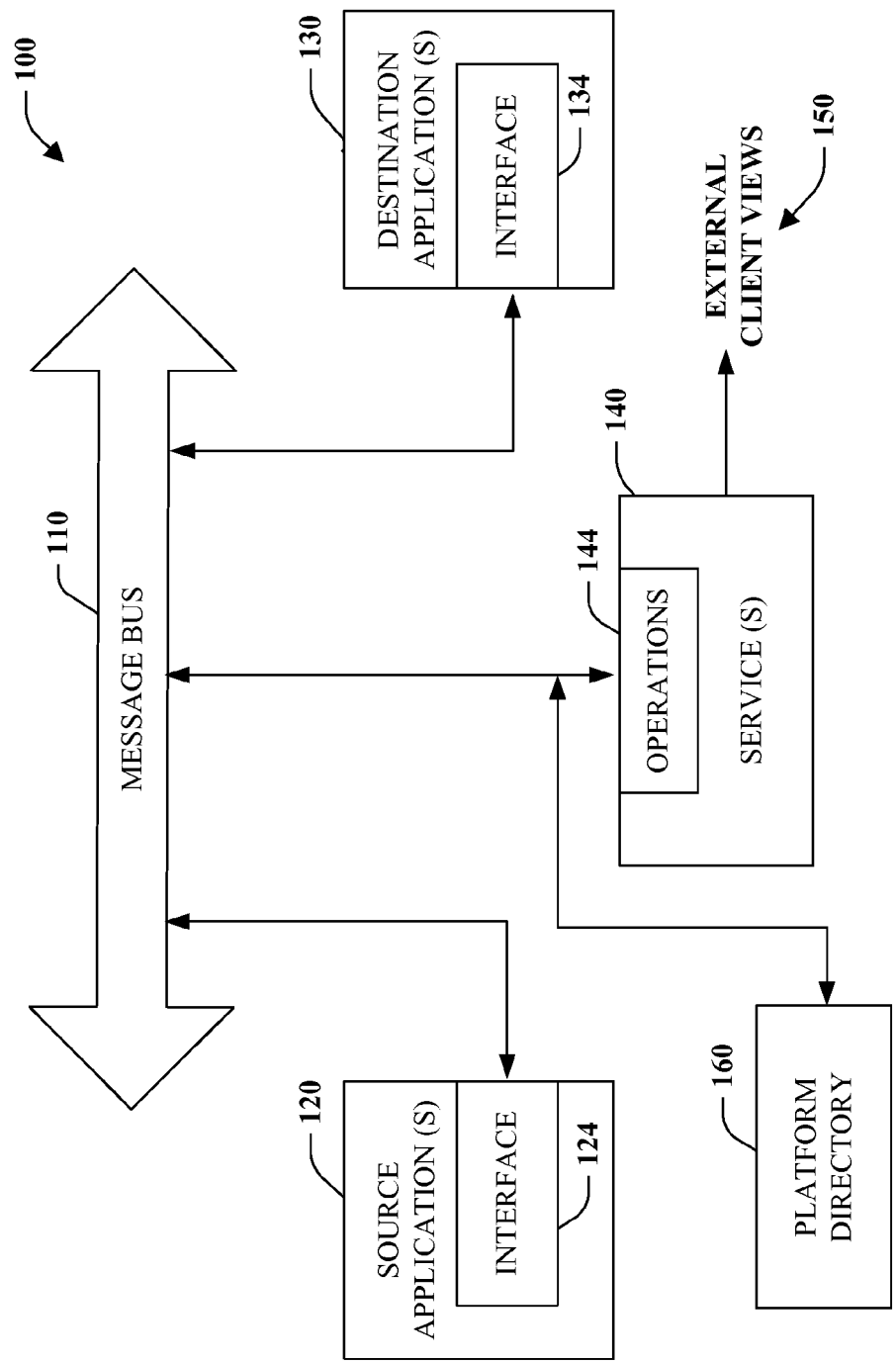
FIG. 1 is a schematic block diagram illustrating services for an industrial automation system.

Referring initially to FIG. 1, a system 100 illustrates services for an industrial automation system. A message bus 110 is employed to communicate to various components across an enterprise. In this system 100, substantially any type of protocol can be employed across the message bus 110 including Ethernet protocols, Internet protocols, and/or factory protocols such as Control and Information Protocol (CIP), for example. As shown, one or more source applications 120 having interfaces 124 communicate across the message bus 110 to one or more destination applications 130 which provide interfaces 134. One or more services 140 are provided that utilize operations components 144 to communicate with the message bus 110, where the services and the operations form an external clients view at 150. Such external view 150 is provided as a higher level abstraction above the interfaces 124 and 134, where the view shows relationships between applications 120 and 130 that can be employed to locate functionality in one application and supply such functionality to another application. At 160, a platform directory may be provided to facilitate application of the services 140, where information such as application addresses and functionality can be indexed in a centralized location for use by the services 140.

In general, the services 140 present an abstraction for an industrial communications infrastructure including the message bus 110 to enable components such as the source and destination applications 120 and 130 to easily locate and connect desired functionality across the infrastructure. The services 140 help locate and connect application interfaces 124 and 134 between applications 120 and 130 (or modules described below) to/from the control system message bus 110. Such services 140 differ from web services since they are not restricted to standard http/SOAP implementations yet the services have the capability to interface with the control system message bus 110 which is in contrast to web services. Although the services 140 are compatible with web services they include operations 144 that exchange messages with the message bus 110 that include industrial protocols employed on the bus. Generally, the services 140 associate higher level behaviors to source applications 120 and destination applications 130 of control system messages such as: how the message will be processed; which output messages will be associated with input messages and vice versa; and how security and encoding rules are to be reconciled by sender and receiver applications. By employing the services to determine/locate available functionality, applications can be efficiently integrated across system components.

In one example, two services 140 can send and receive the same messages. A "Controller" service supports the operations below which exchange messages ItemInfo and Value:

GetData( [in] ItemInfo, [out] Value)
Store ( [in] ItemInfo, [in] Value)
Transmit ( [in] ItemInfo, [in] Value)

An upper level management service supports the operations of GetData, Store, and Transmit which also support the same messages. Each operation has a different meaning yet the message exchanges can appear the same. Thus, in one aspect, services 140 allow more explicit definition and control of message exchange activities.

Typically, an interface presents the developer with a boundary to connect modules together from the module designer's context (e.g., C++, ladder, etc.). The service 140 provides an external 'module clients' view at 150 associating additional information such as security requirements, access rights, and transport protocols required to connect the applications 120 and 130, where the context is common across the system 100 (e.g., language neutral). This information can be provided by engineers, system integrators, or system administrators depending on requirements and capabilities.

A client to the application's interface 124,134 locates services 140 that support the interface they are searching for. The service 140 advises the client of the policies (security, format, and so forth), ports (in memory, CIP, http, and so forth) and diagnostics that are to be satisfied to connect the applications (or modules) together. This information can be grouped into the format suitable to the user's view at 150. Such information can be filtered by port (show memory only) or by a combination (show all ports to interface status). In another aspect, the system 100 can be employed as a messaging system for an industrial control environment. This includes means for interfacing to a control system bus such as via the interfaces 124 and 134. This also includes means for locating application functionality (e.g., services 140) for the control systems bus 110. The messaging system can also include means for publishing data relating to the application functionality such as via the platform directory 160.

The system 100 provides a model that allows module developers to annotate applications or modules with requirements for access to externally visible components which provide the client view at 150 to enable client modules to browse. The application or module identifies its public actions (Commands, Events, Data, Alarms and so forth) in the interface 124, 134, where these actions are mapped to operations that enable additional information to be added to fully describe connection requirements for clients. Services 140 publish these operations on Ports (e.g., CIP, Live Data, JMS, Web Service and so forth). Clients are then able to discover functionality by browsing these associations in the platform directory 160 for example. These relationships allow searches on the automation platform such as; where is this interface deployed?, which ports are the module's interface available on?, what access roles are required to connect to server?, what messages are exchanged during a connection to this module?, and what controller chassis or PC server functionality is required to run the service, for example.

Before proceeding, it is noted that the source applications 120 or the destination applications 130 can be provided as a module (shown below in FIG. 7) which is capable of communicating across the message bus 110. As will be described in more detail below, the module can be employed to define, interface, and execute functionality of one or more industrial control system components. Modules can be accessed across a network from the control components, where the network (in accordance with the message bus 110) allows online access to the modules and their respective control components and also enables creating the modules in an offline manner such as in a computer database (not shown).

In general, the module is an association of logic with one or more resources. The logic includes program code that can alter the state of a resource; for example, ladder code, function chart, script, JAVA, C code, and so forth. The resources are those components or elements that perform an activity in a system including equipment and personnel that perform work in a system. Other examples of types of resources include Equipment, Material, Personnel, Segments and Storage. Personnel and equipment (machines) can perform activities in a system. Resources that can perform work can be classified as active resources (e.g., CNC machine, Injection molding machine), whereas other equipment resources can be considered passive resources (e.g., sensor, material). The modules hide the user from internal interfaces, messages, and logic specific to the resources yet provide standard or generic interfaces to external systems or between components. Modules may include other modules including nested modules (described in more detail below) where standard module behaviors and attribute patterns can be represented using common data model representations for module classes, module templates and module inheritance. Module classes and templates can be maintained in libraries which facilitate access to desired system functionality and further promote system integration.

It is further noted that the components illustrated in the system 100 can include various computer or network components such as servers, clients, programmable logic controllers (PLCs), communications modules, mobile computers, wireless components, control components and so forth which are capable of interacting across the message bus 110. Similarly, the term PLC as used herein can include functionality that can be shared across multiple components, systems, and/or networks. For example, one or more PLCs can communicate and cooperate with various network devices across the message bus 110. This can include substantially any type of control, communications module, computer, I/O device, sensor, Human Machine Interface (HMI)) that communicate via the message bus 110 which includes control, automation, and/or public networks. The PLC can also communicate to and control various other devices such as Input/Output modules including Analog, Digital, Programmed/Intelligent I/O modules, other programmable controllers, communications modules, sensors, output devices, and the like.

The message bus 110 can include public networks such as the Internet, Intranets, and automation networks such as Control and Information Protocol (CIP) networks including DeviceNet and ControlNet. Other networks include Ethernet, DH/DH+, Remote I/O, Fieldbus, Modbus, Profibus, wireless networks, serial protocols, and so forth. In addition, network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 2:
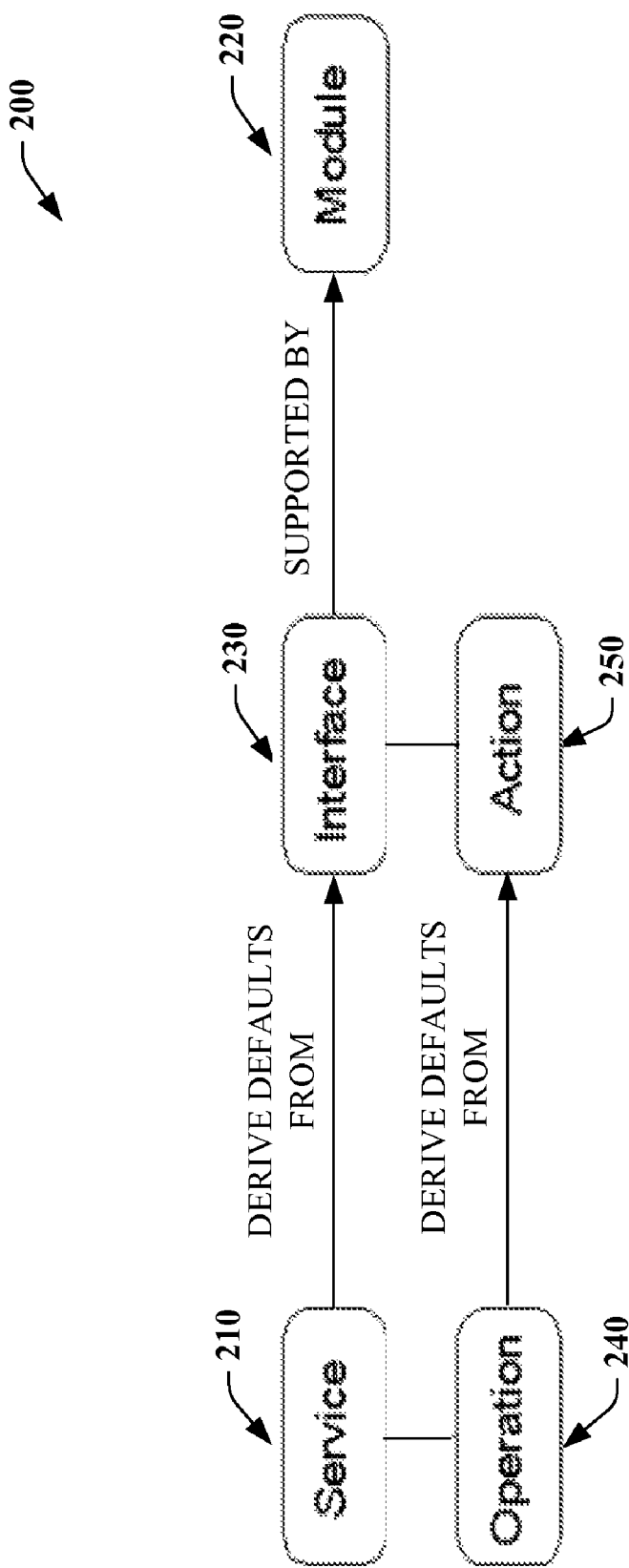
FIG. 2 is a diagram illustrating module, service, and interface relationships.

Referring now to FIG. 2, a system 200 illustrates relationships between services 210, modules 220 (or applications), and interfaces 230 associated with such modules. As shown, the services 210 can include one or more operations 240 and interfaces can include one or more actions 250, where the service 210 can derive default information from the interface 230, and the operations 240 can derive default information from the actions 250.

The configuration of services and operations can be automated; however, users may elect to view or update the configuration information. Typically operations designed to work together are supported on the same service 210. Thus, message bus products can automatically generate default service and operation configurations based on existing module interface definitions. Similarly, meta-data provided by the service 210 and operations 240 can be created based on system policies associated with user interface selection (child module, local access), rather than manual entry by user. Users may also customize the default service and operations. For example the name of the operation 240 provided to clients may be different than an internal name.

Examples in which the user may elect to override default settings include: A control engineer integrates three machines from different vendors that publish part count information in interfaces that have common functionality but different names. The internal HMI and data collection systems expect a common service interface; a company has a set of validated control modules that are mapped into the system as services 210 and operations 240. The names and publication rates of actions on the modules are to be changed, where the operations can be changed without touching the validated module logic. In another example, a customer upgrades their controller to support controller based Live Data and desires to convert some control modules from another Data format. The change can be accomplished by overriding the operation parameters without affecting the underlying module code. In yet another example, a customer has a module supporting 80 actions on his Control Module interface which spans HMI, data collection and control data. The volume and mix of information requires highly trained personnel and is prone to errors when the client's access information is not published for them. The customer updates access permissions on the operations to partition the operations between the three clients.

A client to the module's interface 230 locates services that support the interface they are looking for. The service 210 advises the client of the policies (security, format, etc.), ports (in memory, CIP, http, etc.) and diagnostics needed to connect the modules 220. This information can be grouped into the format appropriate to the user's view.

Figure 3:
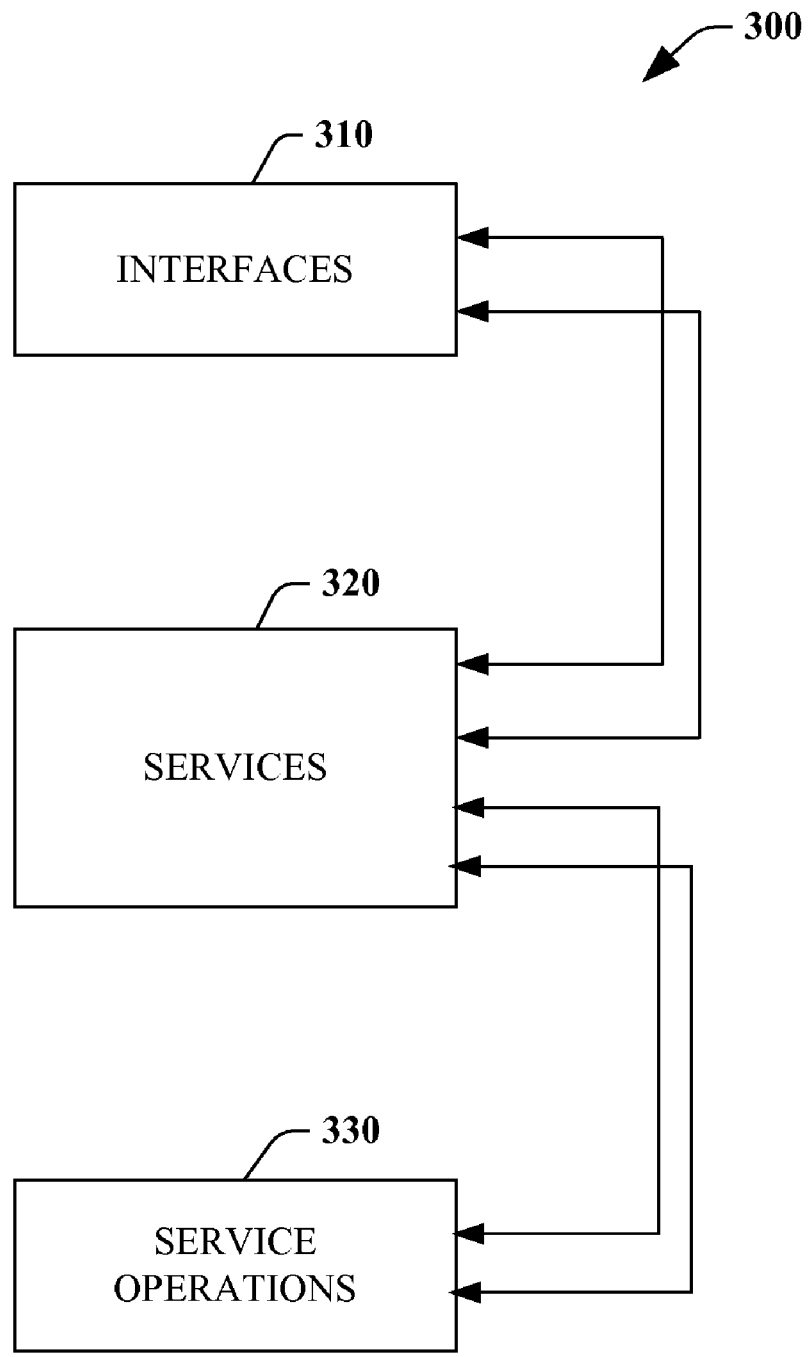
FIG. 3 is a diagram illustrating example relationships between interfaces services, and service operations.

Turning to FIG. 3, a system 300 illustrates relationships between interfaces 310, services 320, and service operations 330. The system 300 illustrates how service information is associated with interface information and the hosts that support the services. The service 320 includes the context required for deployment of the module that exposed the interface 310. This information is employed for standardizing connections to interfaces, and when multiple transports are available. Services 310 allow these transport options to be available in a consistent manner minimizing complexity.

Interfaces 310 provide an internal application logic view of exposed functionality. This includes an application specific view, along with actions and arguments that are in application specific format. Interfaces 310 are aligned with services 320, where the interface is the application developer's view and the service is the operational/implemented view. Typically, clients browse services to locate functionality. Services 320 allow clients/systems view of exposed functionality. System views include identifying the "what, where, and how." Service operations 330 allow the association of communications and deployment data with the actions on the interface 310. Messages are common format of the arguments/data supported on the interface and in communication. The operations 330 may also specify mappings. Operations 330 can be supported on multiple ports, where observing the port from a client can discover the operations supported. Similarly, by observing the service 320, the client can identify what ports are supported.

Figure 4:
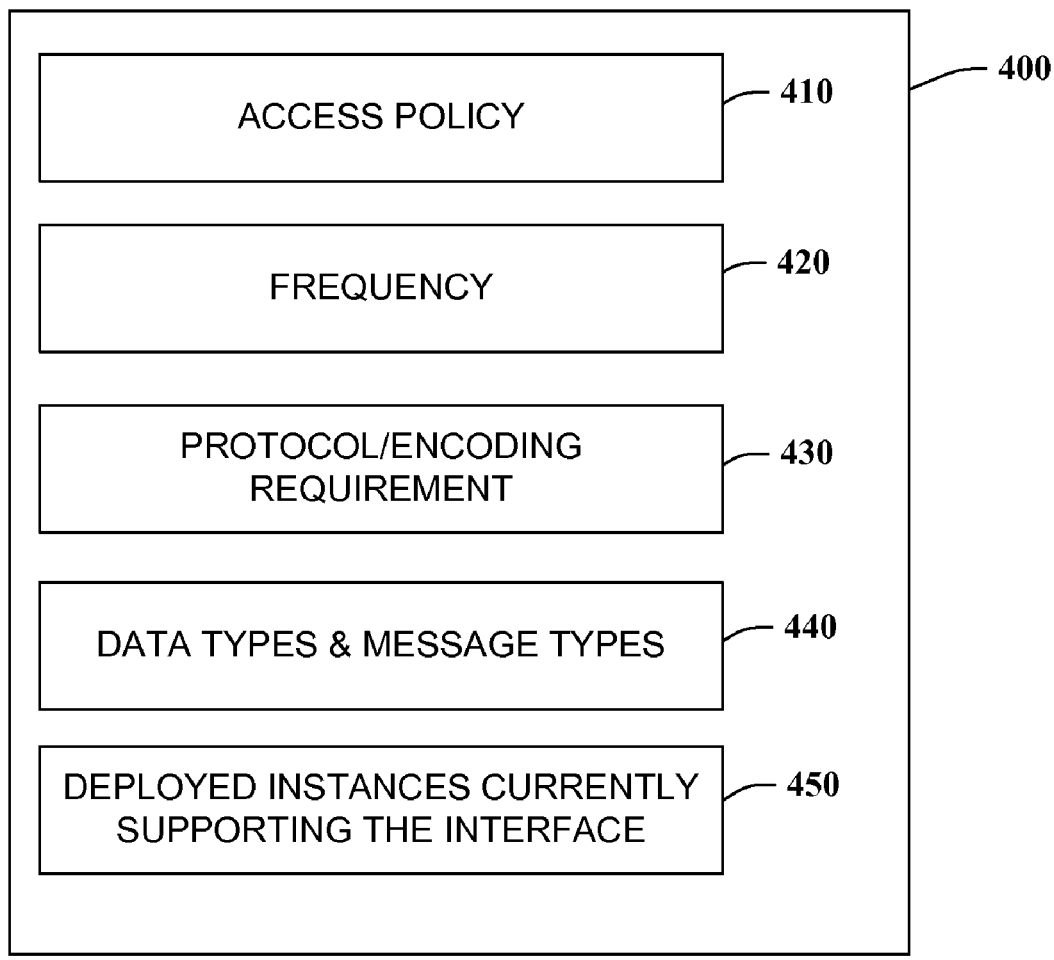
FIG. 4 is a diagram illustrating example service publication data.

FIG. 4 illustrates example service publication data 400. Before proceeding, it is noted that producers of information publish interfaces whose actions (command, event, and so forth) can be exposed to consumers as operations on services, where the services are accessible via ports (typically in a memory or network address). Consumers of information access actions via the service. From an associated server, the consumer can resolve an acceptable interaction with the published interface. The service publishes information at 400 required by the consumer to access the action. Thus, the service publishes policies/requirements required to interact with the interface which can include the following example items.

At 410, the service publication data 400 can include access policy data. This can include security requirements such as role, credentials, encryption levels required, and so forth. The data 410 can also include scope information that outlines applications/hosts/domains allowed access to the interface. At 420, frequency data may be published which can include how often the data producer provides updates to the data consumer, for example. At 430, protocol/encoding requirement data may be published by the service. At 440, data types and message types required to interact with the service operation can be published. At 450, data relating to deployed instances that currently support the interface can also be identified via linkages to hosts established during previous deployment steps. As can be appreciated, other data can be published at 400 from the examples shown at 410-450.

Figure 5:
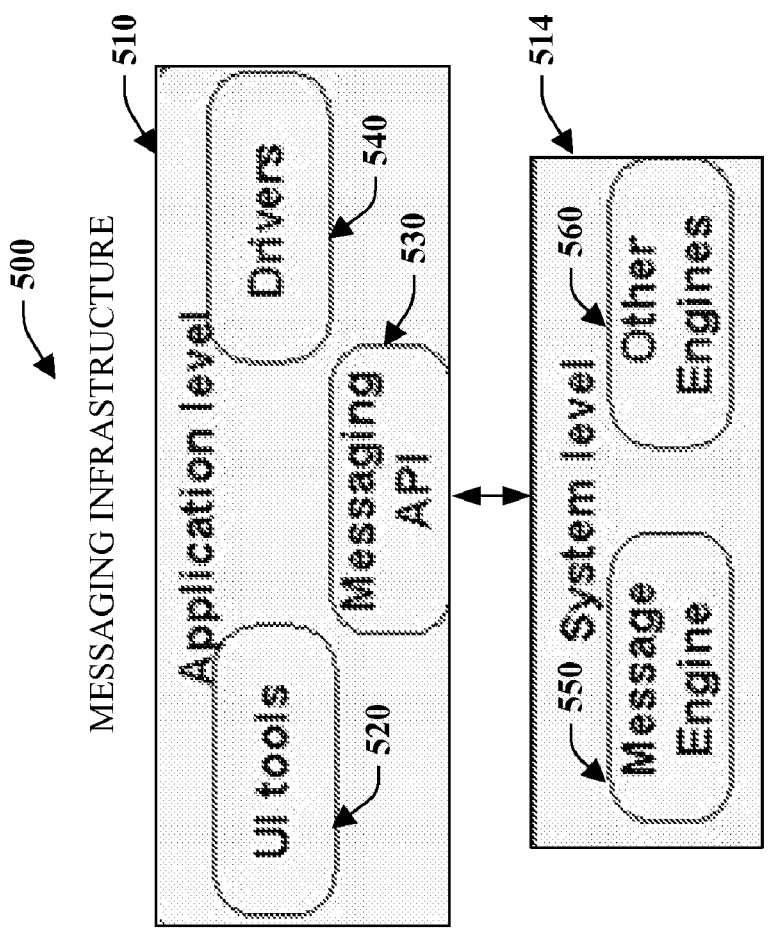
FIG. 5 is a diagram illustrating an example message infrastructure.

FIG. 5 is a diagram illustrating an example message infrastructure 500. Generally, the messaging infrastructure 500 can be modeled into two layers that include an application level 510 and a system level 514. The application level 510 includes user interface (UI) tools 520, a messaging application programming interface (API) 530, and one or more drivers 540. The system level includes at least one message engine 550 and one or more other processing engines 560.

The system level 514 of operation delivers runtime functionality which manages the communications with a production facility, for example. It generally has stringent demands in terms of high availability and predictability. It should be in a known state within the facility. The system level 514 as a result is automated and running with exposed services for configuration and reporting, it executes as part of the automation platform.

The application level 510 includes UI tools 520, API's 530, and drivers 540 that collaborate to provide transparent support for system design and configuration across different environments. In the runtime system, drivers 540 and Message Engines 550 compliment each other to transparently connect modules together. In the simplest case, drivers 540 may facilitate direct connection of modules (or applications) on the same machine such as two control modules within a controller. More advanced message processing activities are handled by message engines 550. In these cases, the driver 540 provides the on ramp for a message onto the message bus, where message engines 550 manage the delivery to configured recipients of the message. To enable this, message engines 550 support a service interfaces to transport channels.

Typically, the messaging infrastructure 500 matches the different operating environments underlying the logical message bus, where the messaging infrastructure components match the respective target environment. For example, drivers 540 implemented in controller modules can be coded as real time code as proposed for CIP data whereas drivers for MES systems can be coded as Java modules.

Figure 6:
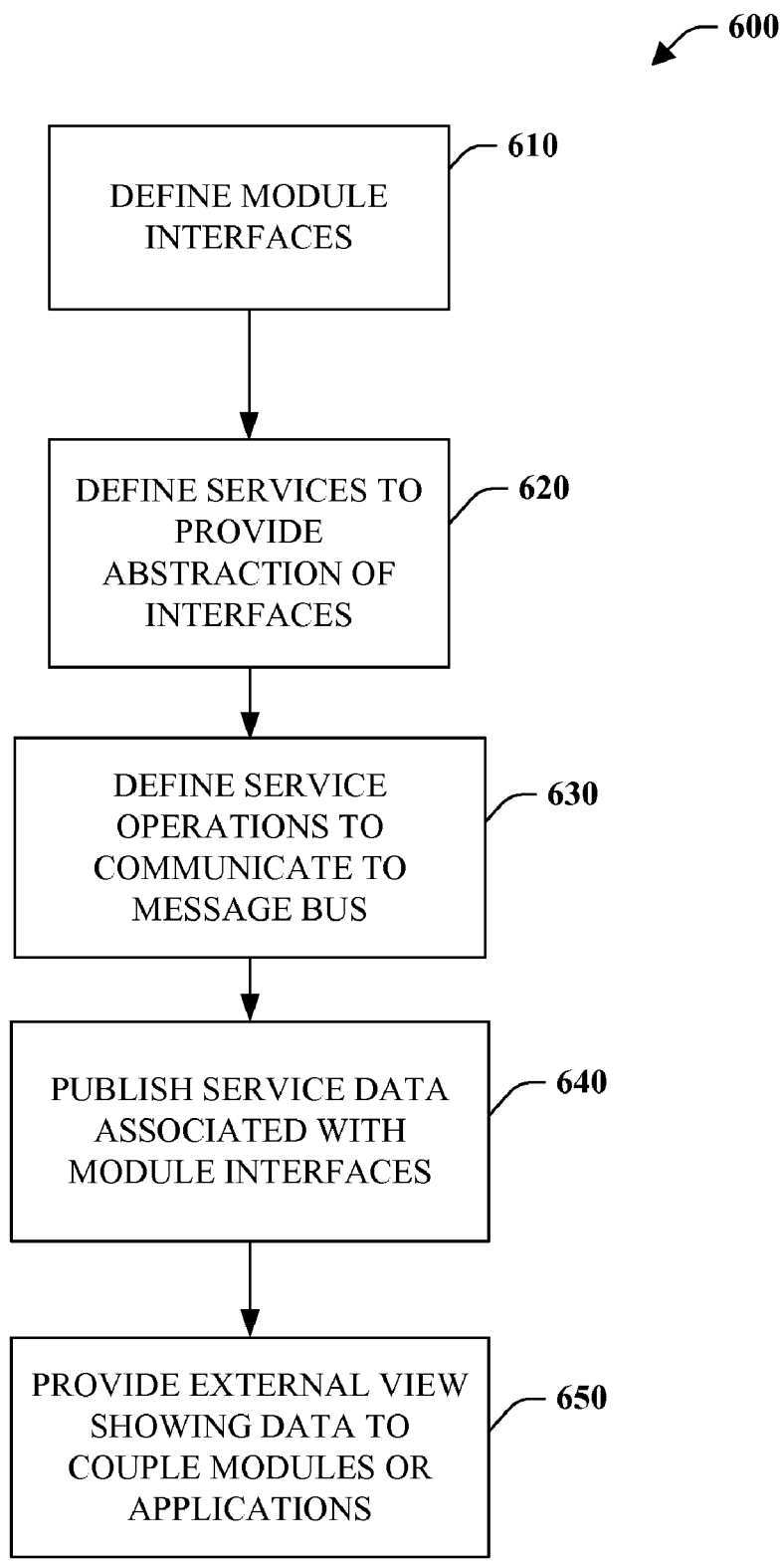
FIG. 6 is a flow diagram illustrating a messaging process.

FIG. 6 illustrates a messaging process 600 for an industrial automation system. While, for purposes of simplicity of explanation, the methodology is shown and described as a series of acts, it is to be understood and appreciated that the methodology is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology as described herein.

Proceeding to 610 of FIG. 6, interfaces are defined for one or more modules. As noted above, modules are similar to applications, where the interfaces define points of communication to interact with the module. For example, the interfaces can be associated with a controller messaging infrastructure where the interfaces define entry points and exit points to a control system message bus. At 620, one or more services are defined to provide a higher level abstraction of the respective interfaces defined at 610. Such abstraction allows developers to locate functionality across a message bus and to see details relating to how to couple functionality to form an overall application. For example, the services may be employed to locate two or more modules that may communicate to form a control application. At 630, service operations are defined. As noted above, such operations can be employed to allow the services defined at 620 to communicate with a message bus.

At 640, data relating to the service defined at 620 is published to allow developers to locate information pertinent to communicating with a module. Such data can include policy data for accessing the respective module, frequency data indicating how often data is presented in a system, protocol or encoding data for communicating with a module, data or message type information, and/or information relating to other deployed instances using such interfaces defined at 610. At 650, a client view is generated enabling developers to view information related to how to couple modules or applications, where such information is presented in a more abstract form than the interfaces themselves to facilitate efficient integration of components or applications across a message bus.

Figure 7:
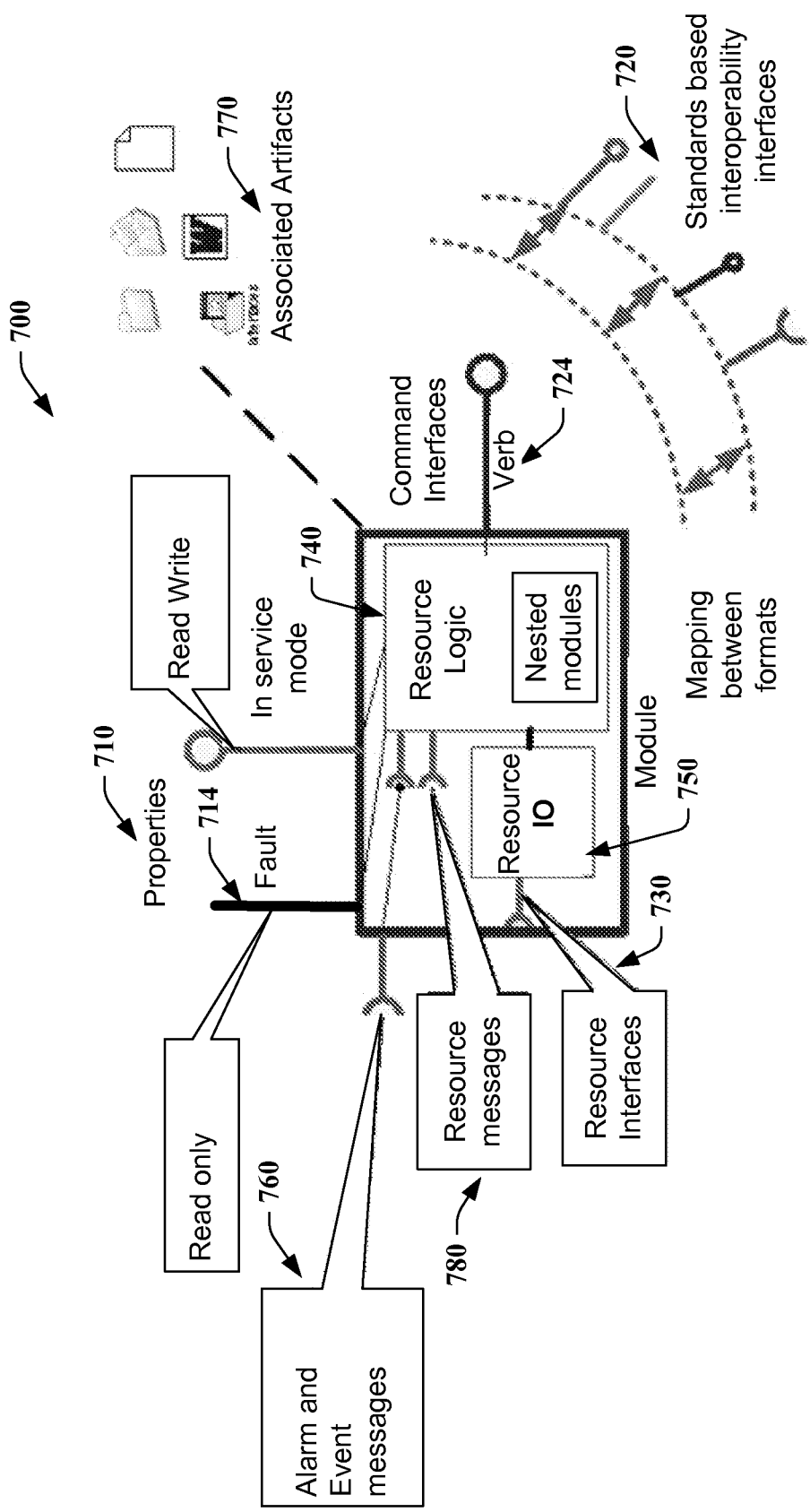
FIG. 7 is a diagram illustrating example module attributes for a messaging process.
Figure 8:
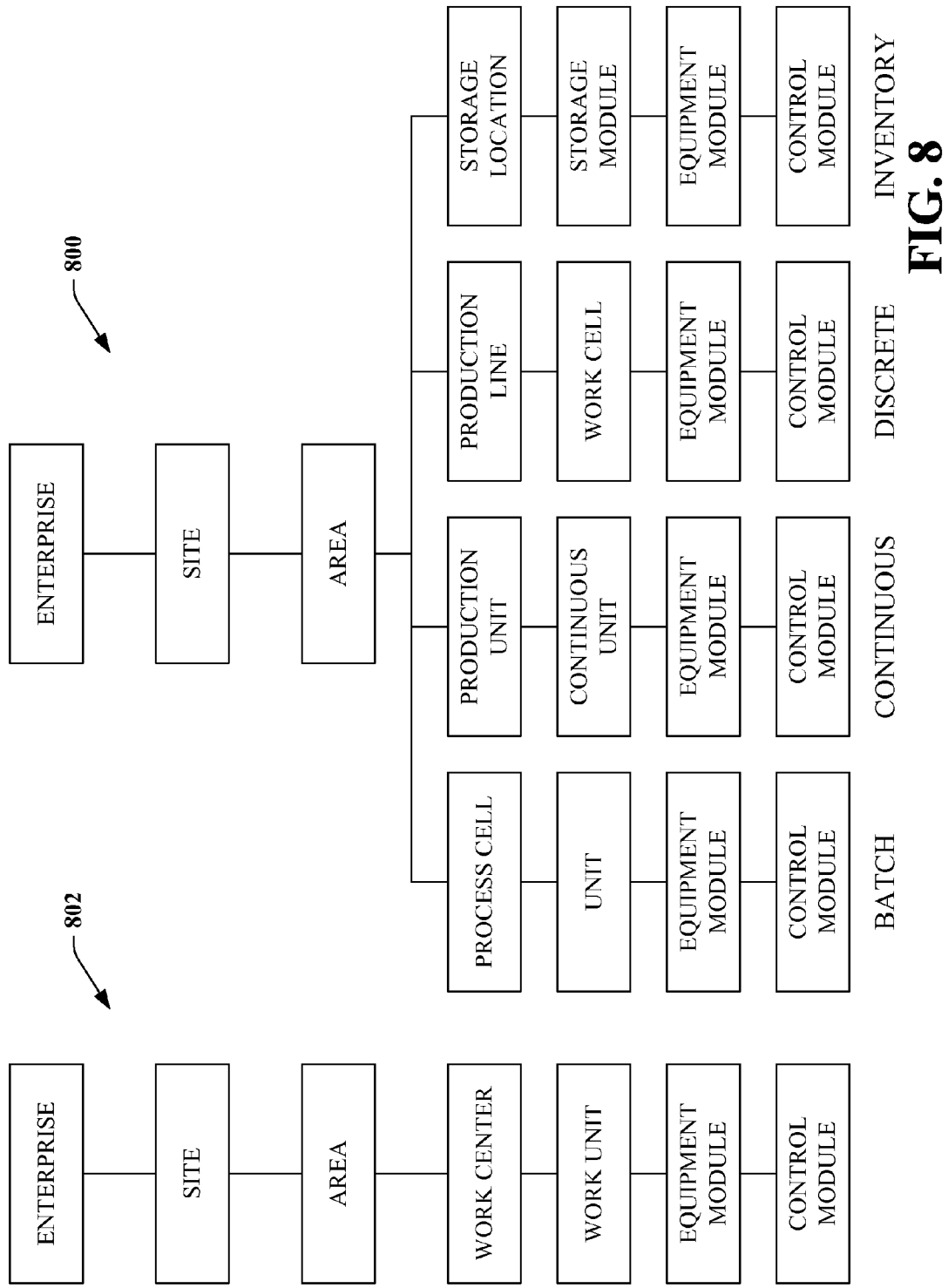
FIGS. 8-11 illustrate a common data model that can be employed with services and modules in an industrial automation system.

Referring now to FIG. 7, module attributes 700 are illustrated, where such attributes can be employed with the services described above. The attributes 700 depicted in FIG. 7 include a common (or exemplary) representation that can be modules from modules. Generally, a set of standard attributes can be determined that are common to all modules. Similarly, for other types of modules described below, additional standard attributes can be defined. An example of a property 710 available on modules includes attributes such as Fault and Status at 714. Active resource modules (e.g., equipment and personnel) can support additional properties 710 such as available/unavailable.

Attributes presented below are represented associations from the module to objects which may be internal in a common data model (See. FIGS. 8-11) or elsewhere (e.g., CAD Files). At 720, standard public interfaces can be provided. These interfaces 720 publish verbs 724 that are available to external systems and are documented activities that hide the complexity of the underlying code used to implement the interface. Interfaces 720 can be considered into at least two common usage scenarios. For example, interfaces 720 can be used as access points that can be used to hook in real time diagnostics, security and so forth.

Public verbs 724 initiate an action within the module. The activity is described to clients of the interface 720. The implementation is considered private and is not presented to clients—for example, Open, Stop, Abort, Shut, and so forth. A data value property 710 provides public access to information that is used by the module during its operation and can be provided by request values and/or internal values (or an equivalent). The association of logic to transfer request values to internal values and vice versa are referred to as get and set logic for the value. It is noted that in a controller, if there is not a set routine to transfer request values to internal values, the internal value can overwrite the request value on the next scan providing read only capability.

In general, the properties 710 can be considered in at least two classifications. States have special significance for production systems and can have a specific set of values that can be represented by range or enumeration. A state can represent the current status of the primary resource being encapsulated by the module e.g., Percent open, Mode, Service (in, out), and so forth. Information that is used by the module during its operation includes access to data that is provided by interfaces 720. e.g., Conversion Map, Name, Description, expiry date, personnel contact information. Some properties 710 can be common to all instances of resource modules (e.g., scanned copy of resource specification documents), whereas other properties 710 are specific to each module instance (e.g., Status, percent open).

At 730, internal resource interfaces include interfaces from logic 740 in the module to the resource being managed at 750, where the logic includes code and/or configuration that processes a command and/or updates state and data properties. In some cases, this can be hardware such as I/O interfaces, or in other cases it is to subordinate resource control modules that have direct interfaces. Some examples include I/O mapping, material management logic routines, and so forth. These interfaces 730 are internal to the module enabling the module's public interfaces 720 and properties 710 to be the boundary to other system components. Modules that wrap different resources but support the same public properties/interfaces can be exchanged without disrupting interfaces to other components. Generally, I/O mapping and system messaging interfaces are exposed during deployment bind processes. When bound, external interfaces 720 to runtime systems may then consider these interfaces as internal.

At 760, alarm and event messages can be provided which include messages that exposed as runtime messages visible to external systems during the execution of the module. This includes alarms and events explicitly coded by the developer and system messages promoted to be visible by external systems. At 770, one or more artifacts include information that document the operation and structure of the resource such as, for example, wiring diagrams, warranties, payroll, parts supplier information, and so forth. Visualization aspects include associated graphics that present the resource state and properties to applications interacting with the resource. For example: faceplates, icons, state overlays, edit dialogs, help files. At 780, system messages allow modules to listen for and publish data model messages to external components. Inbound messages are typically used to manage modules (configure, initialize, propagate properties, and so forth) and publish messages on module activity (resource state, data model messages, and so forth).

FIGS. 8-11 illustrate aspects of a common data model noted above that can be employed with a services architecture. Now turning to FIG. 8, hierarchical representations that can be employed in connection with a schema employed by programmable logic controllers to facilitate use of a hierarchically structured data model are illustrated. The hierarchies illustrated in this figure relate to equipment hierarchies, which can be integrated with procedure hierarchies to generate a robust representation of a plant (which is incorporated within a schema for use in connection with industrial controllers). A first hierarchy 800 illustrates a representation of equipment within a plant given disparate processes. For instance, a hierarchy in accordance with a batch process can include a representation of an enterprise, site, area, process cell, unit, equipment module, and control module. In contrast, a hierarchical representation of equipment within a continuous process can include representations of an enterprise, site, area, production unit, continuous unit, equipment module, and control module. In still more detail, an enterprise can represent an entirety of a company, a site can represent a particular plant, an area can represent a portion of the plant, a process cell can include equipment utilized to complete a process, a unit can relate to a unit of machinery within the process cell, an equipment module can include a logical representation of portions of the process cell, and the control module can include basic elements, such as motors, valves, and the like. Furthermore, equipment modules can include equipment modules and control modules can include control modules. Thus, as can be discerned from the figure, four disparate hierarchical representations can be employed to represent equipment within batch processes, continuous processes, discrete processes, and inventory.

A second hierarchy 802 can be utilized that represents each of the aforementioned hierarchical representations. The hierarchy 802 can include representations of an enterprise, a site, an area, a work center, a work unit, an equipment module, and a control module. Thus, a common representation can be generated that adequately represents the hierarchy 800. For purposes of consistent terminology, data objects can be associated with metadata indicating which type of process they are associated with. Therefore, data objects can be provided to an operator in a form that is consistent with normal usage within such process. For example, batch operators can utilize different terminology than a continuous process operator (as shown by the hierarchy 800). Metadata can be employed to enable display of such data in accordance with known, conventional usage of such data. Thus, implementation of a schema in accordance with the hierarchy 802 will be seamless to operators. Furthermore, in another example, only a portion of such representation can be utilized in a schema that is utilized by a controller. For instance, it may be desirable to house equipment modules and control modules within a controller. In another example, it may be desirable to include data objects representative of work centers and work units within a controller (but not equipment modules or control modules). The claimed subject matter is intended to encompass all such deviations of utilizing the hierarchy 802 (or similar hierarchy) within a controller.

Figure 9:
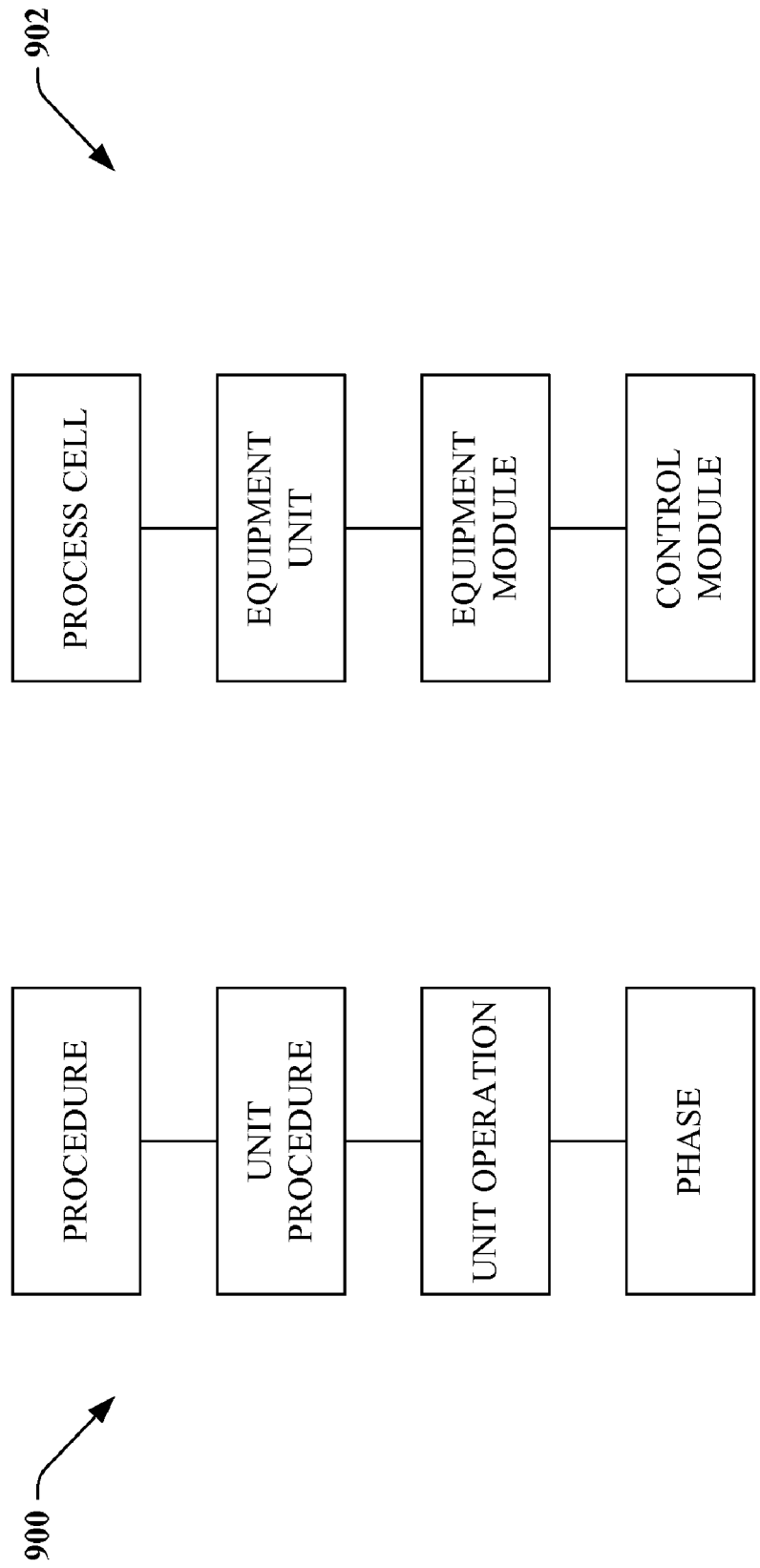

Referring to FIG. 9, example hierarchies that can be utilized to represent procedures and equipment are illustrated. In particular, a hierarchy 900 represents procedures that can exist within a batch process. For instance, a procedure can relate to a high-level procedure, such as creation of a pharmaceutical drug. A unit procedure can be more specific, such as adding particular chemicals to a mix by way of a particular unit. A unit operation can be still more specific, and a phase can be yet more specific (relating to operation of low-level machines). For instance, a phase can relate to various states which can exist with respect to low-level equipment, such as stopping, starting, pausing a motor, opening and closing a valve, and the like. A hierarchy 902 relating to a representation of equipment in, for example, a batch process is displayed adjacent to the hierarchy 900.

Figure 10:
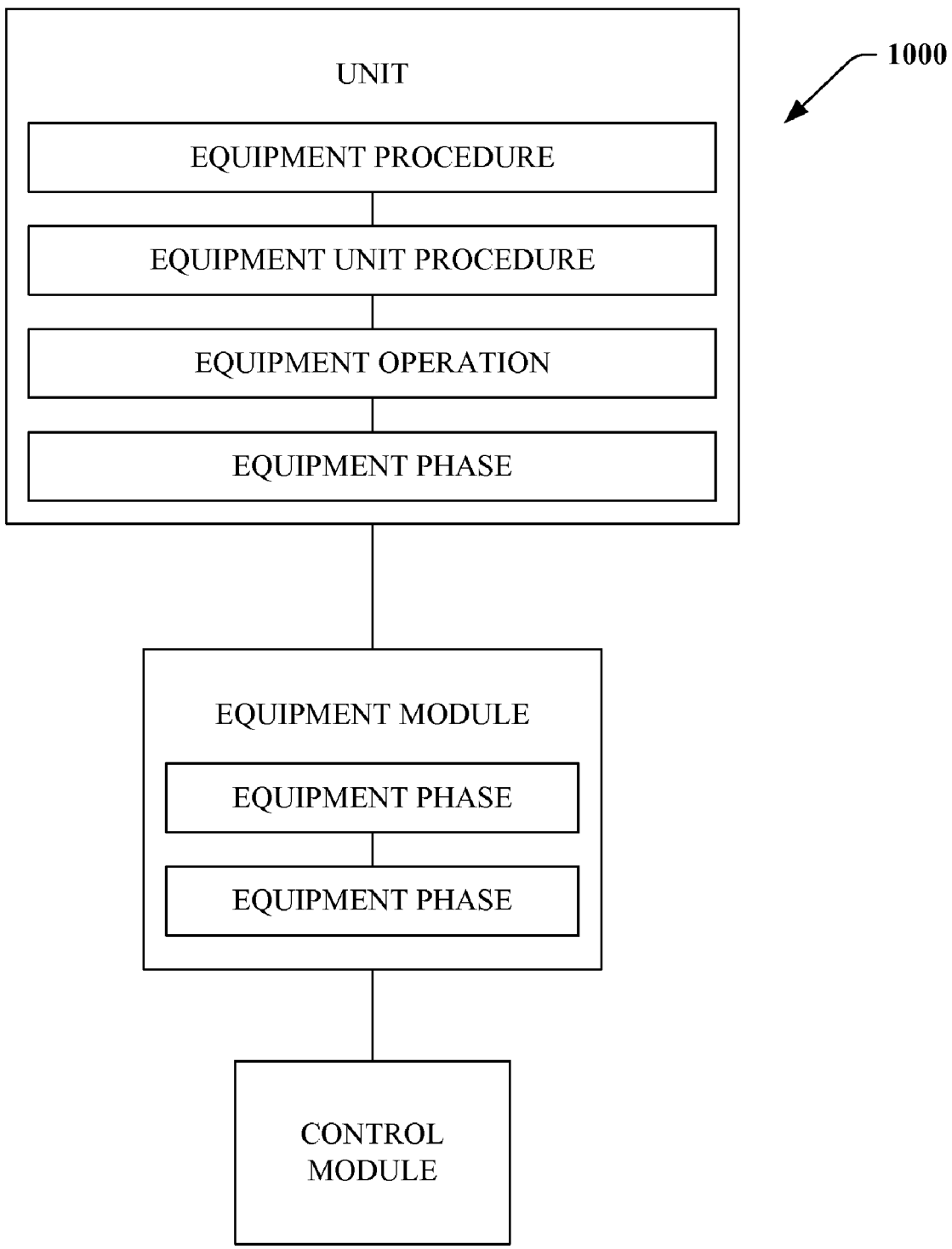
Figure 11:
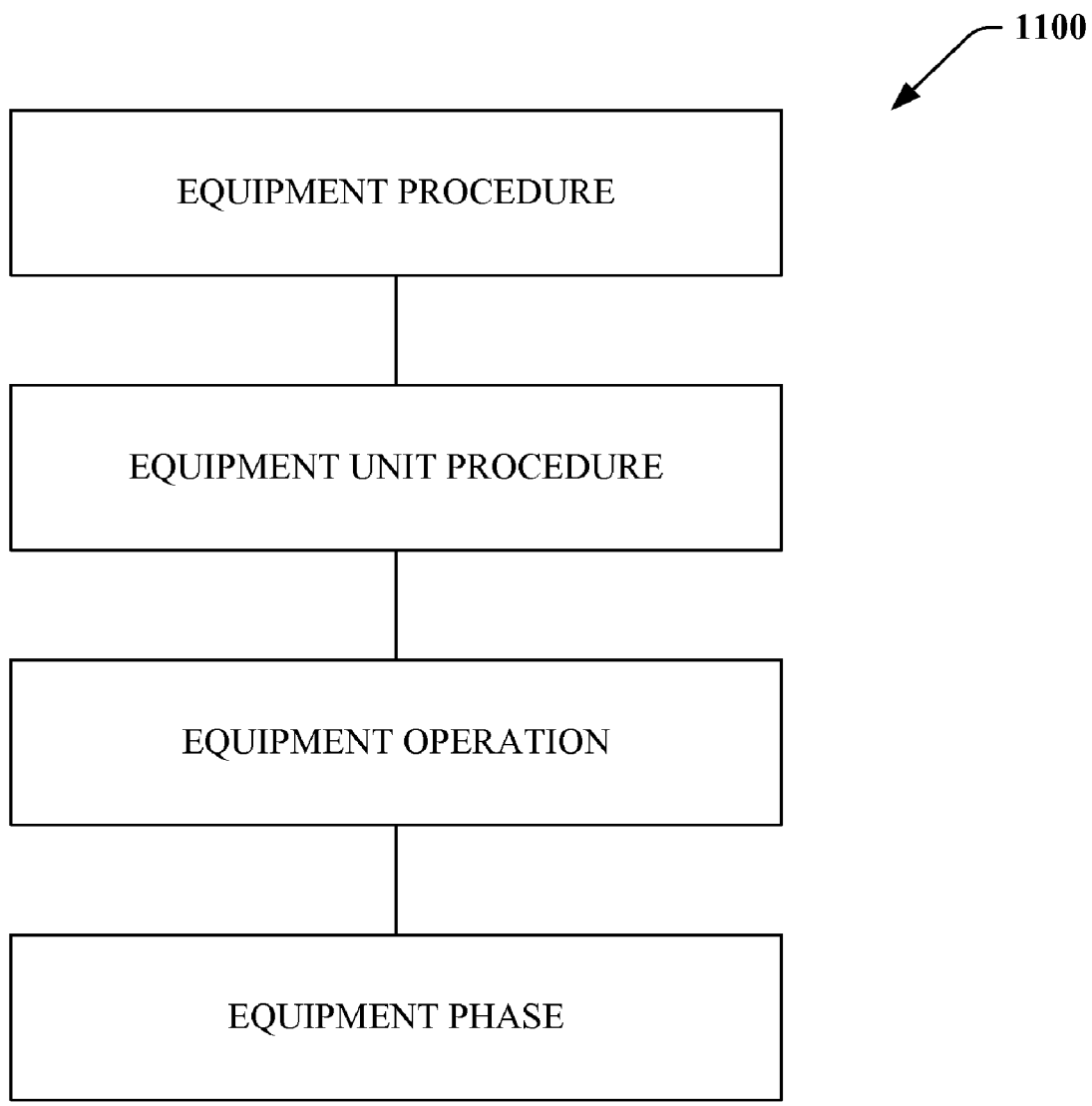

Turning to FIG. 10, a hierarchy 1000 that represents one possible integration of the example hierarchies 900 and 902 (FIG. 9). A unit (such as a work unit described in FIG. 8) can be associated with an equipment procedure, an equipment unit procedure, an equipment operation, and an equipment phase). Thus, the procedures, operation, and phase can be associated with a particular work unit. An equipment module can be associated with one or more equipment phases, and can be above a control module in the hierarchy. Referring Briefly to FIG. 11, a hierarchy 1100 that can be utilized in connection with equipment control is illustrated. The hierarchy is substantially similar to that described within the unit portion of the equipment unit. As stated above, the hierarchies illustrated in FIGS. 8-11 can be based upon a standard, such as ISA 88, ISA 95, or other standard. Any suitable representation that can be utilized to model an entirety of a plant, however, is contemplated. Further, the representations shown in these figures can be directly implemented into a controller. For instance, data objects in accordance with any portion of the hierarchies described in FIGS. 8-11 can be existent within a controller, together with state machines that enable creation of such objects.

It is noted that the above modules can be processed on various types of computing devices and resources, where some of these devices may be associated with an industrial control component and other devices associated with standalone or networked computing devices. Thus, computers can be provided to execute the above modules or associated data that include a processing unit, a system memory, and a system bus, for example. The system bus couples system components including, but not limited to, the system memory to the processing unit that can be any of various available processors. Dual microprocessors and other multiprocessor architectures also can be employed as the processing unit.

It is to be appreciated that software components can be provided that act as an intermediary between users and the basic computer resources described in suitable operating environment. Such software includes an operating system which can be stored on disk storage, acts to control and allocate resources of the computer system. System applications take advantage of the management of resources by operating system through program modules and program data stored either in system memory or on disk storage. It is to be appreciated that the claimed subject matter can be implemented with various operating systems or combinations of operating systems or shared with control systems.

Computers or controllers can operate in a networked environment using logical connections to one or more remote computers. The remote computer(s) can be a personal computer, a server, a router, a network PC, a workstation, a microprocessor based appliance, a peer device or other common network node and the like, and typically includes many or all of the elements described relative to computer. Remote computers can be logically connected through a network interface and then physically connected via communication connection. Network interfaces encompass communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL), and wireless networks.

The systems described above employing the authentication protocols can include one or more client(s). The client(s) can be hardware and/or software (e.g., threads, processes, computing/control devices). The systems can also include one or more server(s). The server(s) can also be hardware and/or software (e.g., threads, processes, computing/control devices). The servers can house threads to perform transformations by employing the authentication protocol, for example. One possible communication between a client and a server may be in the form of a data packet adapted to be transmitted between two or more computer processes.

What has been described above includes various exemplary aspects. It is, of course, not possible to describe every conceivable combination of components or methodologies for purposes of describing these aspects, but one of ordinary skill in the art may recognize that many further combinations and permutations are possible. Accordingly, the aspects described herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system embodied on a computer-readable storage medium that, when executed on one or more processors, facilitates communications in an industrial automation system, comprising:
   a message component, comprising:
      a service component that locates functionality of applications communicatively coupled to a control system message bus; and
      an operations component that exchanges messages with the message bus, the service component and the operations component form a browsable external view that illustrates relationships between the applications and specifies security requirements, access rights, and transport protocols required to connect to each application, the external view enabling selection of functionality associated with a first application on the message bus to be supplied to a second application on the message bus to form a control application.

2. The system of claim 1, the service component is associated with at least one messaging application.

3. The system of claim 1, the service component is associated with at least one industrial control protocol.

4. The system of claim 1, further comprising a platform directory to which the operations component publishes data associated with the applications for access by a user, the data including at least security requirements for accessing the application and protocol requirements for communicating with the application.

5. The system of claim 1, the service component is adapted as a web service that is compatible with industrial protocols.

6. The system of claim 1, the service component links lower level control applications with upper level management servers.

7. The system of claim 1, the service component publishes at least one of security requirements, access rights, a policy, a diagnostic, a port, or a transport protocol associated with each application on the message bus.

8. The system of claim 4, further comprising a user interface that allows application developers to annotate applications with requirements for access to externally visible components, the requirements browsable by a client using the platform directory.

9. The system of claim 1, the service component is associated with an interface that includes one or more actions.

10. The system of claim 9, the service component determines default behaviors from the interface and the operations component determines default behaviors from the actions.

11. The system of claim 10, the service component is associated with control system meta-data.

12. The system of claim 10, further comprising a user interface to allow users to override the default behaviors.

13. The system of claim 1, further comprising a browser component to locate desired application functionality.

14. The system of claim 1, further comprising an interface to display data mappings.

15. The system of claim 1, further comprising at least one module that is associated with at least one of an active or a passive resource of the industrial automation system.

16. The system of claim 15, the at least one module includes standard module behaviors and attribute patterns that are represented using common data model representations for module classes, module templates, and module inheritance.

17. The system of claim 16, the module classes and module templates are maintained in libraries that facilitate access to desired system functionality.

18. The system of claim 15, the module further comprising one or more attributes that include one or more system messages that allow modules to listen for and publish data model messages to external components.

19. A computer-readable storage medium having a data structure stored thereon to facilitate communications in an industrial automation environment, comprising:
a first data field that specifies operations that communicate with a message bus;
a second data field to specify services that employ the operations to communicate with the message bus to locate desired functionality associated with applications coupled to the message bus; and
a third data field that generates an external view of the applications based in part on the operations and the services, the external view illustrating relationships between the applications together with security requirements, access rights, and transport protocols required to connect to each of the applications.

20. The computer-readable storage medium of claim 19, further comprising a module interfaces field that is associated with the services.

21. The computer-readable storage medium of claim 19, further comprising a service data field that publishes data associated with the services.

22. The computer-readable storage medium of claim 21, the service data field defining and publishing at least one module access policy for at least one service.

23. The computer-readable storage medium of claim 21, the service data field further comprising a frequency field that defines and publishes a data transmission rate for at least one service.

24. The computer-readable storage medium of claim 21, the service data field further comprising a protocol data field that defines and publishes a protocol requirement for at least one service.

25. The computer-readable storage medium of claim 21, the service data field further comprising a data type field that defines and publishes at least one of a data type or a message type required to interact with the service.

26. The computer-readable storage medium of claim 21, further comprising a deployed instances field that identifies deployed instances that currently support an interface associated with a given application on the message bus.

27. A method for coupling industrial control components, comprising:
employing a processor executing computer executable instructions stored on a computer readable storage medium to implement the following acts:
defining one or more interfaces for each of a plurality of modules communicatively coupled to an industrial control system message bus, each of the one or more interfaces providing a point of communication through which to interact with each of the respective modules;
defining at least one service that publishes functionality and access policy information associated with the plurality of modules and
generating a user interface that provides a view of the published functionality and access policy information for each of the plurality of modules, the user interface allowing a user to locate at least two modules on the message bus having desired functionality and to couple the at least two modules across the message bus via the respective interfaces associated with each of the at least two modules to form a control application.

28. The method of claim 27, further comprising defining one or more operations for the at least one service.

29. The method of claim 27, further comprising discovering the at least one service by browsing a platform directory containing an index of the functionality associated with the plurality of modules.

30. The method of claim 27, further comprising defining at least one action that is associated with the one or more interfaces.

31. The method of claim 27, further comprising determining default values for the at least one service.

32. The method of claim 31, further comprising generating an interface to override the default values.

33. A messaging system for an industrial control environment, comprising:
a processor;

a memory communicatively coupled to the processor, the memory having stored therein computer-executable instructions configured to implement the messaging system, including:
means for interfacing to a control system bus;
means for locating functionality associated with a set of applications coupled to the control systems bus; and
means for generating a user interface that provides a browsable view of the functionality, the user interface facilitating selective connectivity between the set of applications to form at least one control application.

34. The messaging system of claim 33, further comprising means for publishing data relating to each of the applications, the data including at least security requirements for accessing the respective applications and identification of domains allowed to access the respective applications.

* * * * *